United States Patent

[11] 3,619,744

| | | |
|---|---|---|
| [72] | Inventor | Budd James Stephenson<br>Niagara Falls, N.Y. |
| [21] | Appl. No. | 15,464 |
| [22] | Filed | Mar. 2, 1970 |
| [45] | Patented | Nov. 9, 1971 |
| [73] | Assignee | National Lead Company<br>New York, N.Y. |

[54] MONOLITHIC CAPACITORS
3 Claims, 1 Drawing Fig.

[52] U.S. Cl.................................................. 317/258,
252/63.5, 252/514
[51] Int. Cl....................................................... H01g 1/01
[50] Field of Search............................................ 317/258;
252/514, 63.5, 63.2

[56] References Cited
UNITED STATES PATENTS
3,021,589 2/1962 Weller.......................... 317/258 X

*Primary Examiner*—E. A. Goldberg
*Attorney*—Ashlan F. Harlan, Jr.

ABSTRACT: A low-cost monolithic capacitor having a high resistance to capacity change over the temperature range from −50° to 130° C. comprises superimposed alternate layers of a fired ceramic dielectric composition containing from about 93 mol % to about 96 mol % $BaTiO_3$, from about 2.5 mol % to about 4.75 mol % $PbBi_4Ti_4O_{15}$ and from about 1.0 mol % to about 2.25 mol % of an additive selected from the group $BaO \cdot Nb_2O_5$, $BaO \cdot Ta_2O_5$, $PbO \cdot Nb_2O_5$ and $PbO \cdot Ta_2O_5$, and electrodes containing up to about 90% palladium, the remainder being gold and/or platinum.

PATENTED NOV 9 1971 3,619,744
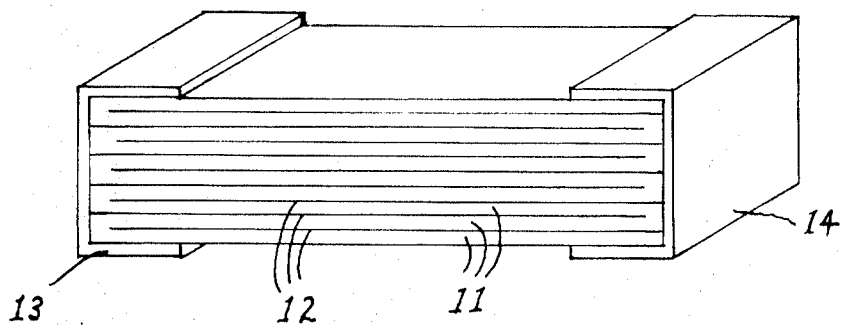
13   12   11   14
INVENTOR.
BUDD J. STEPHENSON
BY
ATTORNEY

MONOLITHIC CAPACITORS

BACKGROUND OF THE INVENTION

This invention is concerned with capacitors and is particularly concerned with multilayer ceramic capacitors of the type called, in the art, monolithic capacitors. Such capacitors have been known for a number of years and the general method of manufacturing them is well known in the art. See, for example, British Pat. No. 693,455, published July 1, 1953; Ceramic Industry Magazine, July 1969, pp. 49–58, 68–70; and EDN, Mar. 15, 1969, pp. 81–84. Broadly, the known procedure includes the steps of forming films of organically bonded dielectric ceramic material, silk screening noble metal electrodes such as platinum, palladium, or gold, on strips of the film of unfired dielectric ceramic material, stacking the strips so that the electrodes appear alternately at opposite ends of the strips, compressing the stack, and firing the compressed stack at the temperature necessary to mature the ceramic and consolidate the whole into a solid, monolithic unit. Subsequently, it is common to metallize the opposite ends of the units where the alternate electrodes appear, thereby obtaining a monolithic capacitor to which leads may be soldered.

Within the range of about 1,000 pf. to 1 µf. capacity monolithic capacitors find a considerable usefulness in hybrid circuits. However, the maximum benefits of ceramic monolithic capacitors are obtained when the permittivity is high and the variation of permittivity with temperature is small. For many applications it is desirable to have a temperature variation of not more than about ±15 percent from the permittivity at 25° C. over the temperature range from −50° to 130° C. at a frequency of 1 kHz. Such a low temperature coefficient has been obtainable but generally only by the use of a ceramic body containing quite appreciable amounts of bismuth. This has created a problem with electrodes since palladium, the least expensive of the noble metals used for electrodes in monolithic capacitors, has hitherto been found unsuitable for use with dielectric materials which contain substantial amounts of bismuth because of reaction between the palladium and bismuth compounds at the maturing temperature of the monolithic body. Platinum or alloys containing very substantial amounts of platinum have been required.

SUMMARY OF THE INVENTION

It is an object of the invention to produce relatively inexpensive monolithic capacitors which have a very low variation of permittivity with variation in temperature through a wide range. This object is achieved by forming the capacitors from a ceramic dielectric composition of the type described and claimed in copending application for U.S. Pat., Ser. No. 15,896, filed concurrently herewith by Truman C. Rutt, for Dielectric Compositions and Articles Therefrom. Although such ceramic dielectric compositions contain bismuth oxide, they may be matured at temperatures so low, (1,080° TO 1,100° C.), that when they are used to form monolithic capacitors with electrodes containing palladium in substantial amounts there is no appreciable reaction between the bismuth in the composition and the palladium. Electrodes containing up to about 90 percent palladium with the remainder gold and/or platinum may be employed.

SHORT DESCRIPTION OF THE DRAWING

In the single FIGURE of the drawing, which shows diagrammatically on an enlarged scale a monolithic capacitor according to the present invention, the reference characters 11 indicate the layers of ceramic dielectric material, the reference characters 12 indicate the internal metallic electrode layers, and the reference characters 13 and 14 indicate the electrode connectors that electrically join alternate internal electrodes along opposed edges of the capacitor.

DESCRIPTION OF PREFERRED EMBODIMENT

It will be understood that the fabricating procedure used in forming monolithic capacitors according to the present invention is not critical to the present invention nor a part thereof. The invention here resides in the combination in monolithic capacitors of certain ceramic dielectric compositions with electroding compositions containing substantial amounts of palladium, the maturing temperature of the dielectric composition being sufficiently low that appreciable reaction between bismuth compounds therein and the palladium will not occur when the monolithic capacitors are fired.

Accordingly, known procedures may be employed in forming the alternate layers of dielectric composition and electroding composition, pressing and firing the assembly, and in providing electrode connectors on the edge surfaces which electrically join the internal electrodes in the formed and fired body.

Dielectric compositions such as those disclosed in the above-mentioned application and defined in claim 1 thereof are employed. The said application is concerned with ceramic dielectric compositions composed of barium titanate $BaTiO_3$), oxides of titanium, lead, and bismuth in ratios corresponding to the compound lead bismuth titanate $PbBi_4Ti_4O_{15}$), and one or more additives selected from the group barium niobate $(BaO \cdot Nb_2O_5)$ barium tantalate $(BaO \cdot Ta_2O_5)$, lead niobate $(PbO \cdot Nb_2O)$, and lead tantalate $(PbO \cdot Ta_2O_5)$. Such compositions containing from about 93 mol % to about 96 mol % $BaTiO_3$, from about 2.5 mol % to about 4.75 mol % $PbBi_4Ti_4O_{15}$ (or the equivalent in oxides or oxide-forming compounds), and from about 1.0 mol % to about 2.25 mol % of the additive when fired for about 1 hour in the temperature range from 1,080° to 1,100° C. give ceramic dielectric bodies which have permittivities ($\epsilon$) of 1,200 to 1,800 when measured at 25° C. and a frequency of 1 kHz. and a variation in permittivity of not more than ±17 percent in the temperature range between −50° and 130° C. The compositions may be formed by mixing together the constituent oxides as such or as convenient combinations, for example $PbBi_4Ti_4O_{15}$, with each other. If desired, one or more of the constituent oxides may be added to the mixture as a compound with other elements which compound, at or below the maturing temperature of the composition, decomposed to free the desired oxide and does not leave a residue other than the desired oxide or oxides.

A typical dielectric composition of the desired type is composed of 77.3 mol % $BaTiO_3$, 3.00 mol % PbO, 0.86 mol % BaO, 6.00 mol % $Bi_2O_3$, 12.0 mol % $TiO_2$, and 0.86 mol % $Nb_2O_5$. This corresponds to 95.3 mol % $BaTiO_3$, 2.70 mol % $PbBi_4Ti_4O_{15}$, and 1.05 mol % $BaO \cdot Nb_2O_5$. Ceramic dielectric bodies pressed from the mixture and fired at about 1,090° C. in an oxidizing atmosphere for about 1 hour, when tested at 25° C. and with a frequency of 1 kHz, were found to have a permittivity ($\epsilon$) of 1,565 and a variation in $\epsilon$ between −50° and 130° C. of −13.3% and +5.1%.

Another typical composition is disclosed in example 1, below. It is the equivalent of 95.5 mol % $BaTiO_3$, 2.77 mol % $PbBi_4Ti_4BH15$, and 1.73 mol % $PbO \cdot Nb_2O_5$.

The conductive metal of the electroding compositions may contain up to about 90 percent palladium, the remainder being gold and/or platinum, together with a conventional vehicle. It will be evident that the benefits of the present invention in reducing electrode cost are most apparent when relatively large amounts of palladium are used. Although savings are more appreciable when the palladium percentage is from about 50 to 90 percent, material savings are obtained even when the palladium content is as low as about 25 percent. Electrodes with palladium contents above 90 percent are not preferred since there is a chance of interaction with the dielectric composition.

EXAMPLE 1

A ceramic dielectric composition consisting of 80.7 mol % barium titanate, 3.81 mol % lead oxide (PbO), 4.68 mol % bismuth oxide, 1.47 mol % niobium pentoxide and 9.35 mol % titanium dioxide is used, the composition being prepared substantially in accordance with the above-mentioned application. Using ethyl cellulose as a bond, 0.1 mm. thick films are formed from the dielectric composition. An electroding paste containing (metal basis) 85.48 percent palladium, 11.04 percent gold and 3.48 percent platinum is applied to the films by silk screen printing and stacked sheets are pressed at 3,000 p.s.i before firing, first to 970° C. in an oxidizing atmosphere to burn out organic matter, and then at 1,090° C. for 2 hours to mature the body. Electrode connectors are applied to the opposite ends of the resulting monolithic body to bond the exposed internal electrodes.

A capacitor formed as above described is found when tested at 25° C. and 1 kHz. to have a capacity consistent with the high dielectric constant of the dielectric composition used and the capacity does not vary more than 15 percent from the determined FIGURE over the temperature range from −50° to 130° C.

EXAMPLE 2

A monolithic capacitor made substantially the same as in example 1 but using instead of the palladium-gold-platinum electroding paste one in which the metal is 73.5 percent palladium and 26.5 percent gold also showed excellent resistance to capacity changeover the temperature range from −50° to 130° C.

As indicated above, applicant has made possible material savings in the cost of producing low temperature-coefficient monolithic capacitors by the use with electrodes containing large amounts of palladium of a bismuth-containing ceramic dielectric composition which matures at 1,080° −1,100° C. Because of the low firing temperature required, additional savings are possible by carrying out the firing on chain belts, thus facilitating mass production.

Except where otherwise indicated or specified, percentages stated herein are percentages by weight.

I claim:

1. A monolithic capacitor comprising superimposed alternate layers of a fired ceramic dielectric composition and palladium-containing electrodes bonded together into a unitary body, said composition consisting essentially of from about 93 mol % to about 96 mol % $BaTiO_3$, from about 2.5 mol % to about 4.75 mol % $PbBi_4Ti_4O_{15}$, and from about 1.0 mol % to about 2.25 mol % of an additive selected from the group consisting of $BaO \cdot Nb_2O_5$, $BaO \cdot Ta_2O_5$, $Nb_2O_3$, and $PbO \cdot Ta_2O_5$, and the metal portion of said electrodes consisting of up to about 90 percent palladium, the remainder being selected from the group of metals consisting of gold and platinum.

2. A monolithic capacitor as defined in claim 1 in which the metal portion of said electrodes contains from about 50 to about 90 percent palladium.

3. A monolithic capacitor as defined in claim 1 in which the metal portion of said electrodes contains from about 25 to 90 percent palladium.

* * * * *